US011933083B2

(12) United States Patent
Reusch

(10) Patent No.: US 11,933,083 B2
(45) Date of Patent: Mar. 19, 2024

(54) MOTOR VEHICLE LOCK

(71) Applicant: Kiekert AG, Heiligenhaus (DE)

(72) Inventor: Manuel Reusch, Düsseldorf (DE)

(73) Assignee: Kiekert AG, Heiligenhaus (DE)

( * ) Notice: Subject to any disclaimer, the term of this patent is extended or adjusted under 35 U.S.C. 154(b) by 246 days.

(21) Appl. No.: 17/420,225

(22) PCT Filed: Dec. 12, 2019

(86) PCT No.: PCT/DE2019/101078
§ 371 (c)(1),
(2) Date: Jul. 1, 2021

(87) PCT Pub. No.: WO2020/143866
PCT Pub. Date: Jul. 16, 2020

(65) Prior Publication Data

US 2022/0098903 A1 Mar. 31, 2022

(30) Foreign Application Priority Data

Jan. 11, 2019 (DE) ..................... 10 2019 100 593.0

(51) Int. Cl.

| | |
|---|---|
| ***E05B 81/68*** | (2014.01) |
| ***E05B 81/66*** | (2014.01) |
| ***E05B 85/24*** | (2014.01) |
| ***E05B 85/26*** | (2014.01) |

(52) U.S. Cl.
CPC .............. *E05B 81/68* (2013.01); *E05B 81/66* (2013.01); *E05B 85/243* (2013.01); *E05B 85/26* (2013.01)

(58) Field of Classification Search
CPC ........... E05B 81/64; E05B 81/66; E05B 81/68
See application file for complete search history.

(56) References Cited

U.S. PATENT DOCUMENTS 5,890,384 A * 4/1999 Bartel ..................... E05B 81/64 70/264
7,026,897 B2 * 4/2006 Lamb ...................... E05B 81/66 335/207

(Continued)

FOREIGN PATENT DOCUMENTS

DE 2728042 A1 1/1979
DE 10065100 A1 7/2002

(Continued)

OTHER PUBLICATIONS

Computer Generated Translation for DE 10065100 A1, Generated on May 2, 2023, https://worldwide.espacenet.com/ (Year: 2023).*

(Continued)

*Primary Examiner* — Alyson M Merlino
(74) *Attorney, Agent, or Firm* — Renner, Otto, Boisselle & Sklar, LLP

(57) ABSTRACT

A motor vehicle lock for a movable part of a vehicle, comprising a locking mechanism consisting of at least one pawl and one rotary latch, and comprising a sensor arrangement that is assigned to the locking mechanism and has a fixed sensor and a sensing element that is disposed on the rotary latch, or vice versa, wherein the sensor generates at least two different output signals associated with the presence and absence of the sensing element in the region of influence of the sensor.

15 Claims, 2 Drawing Sheets

(56) References Cited

U.S. PATENT DOCUMENTS

| | | | | |
|---|---|---|---|---|
| 8,067,935 | B2 * | 11/2011 | Burrows | A61J 7/0436 215/230 |
| 9,316,022 | B2 * | 4/2016 | Tyner | E05B 47/068 |
| 2007/0126577 | A1 * | 6/2007 | Cervantes | E05B 81/66 340/686.1 |

FOREIGN PATENT DOCUMENTS

| | | | | | |
|---|---|---|---|---|---|
| DE | 10330194 | A1 | | 1/2005 | |
| DE | 202005017541 | U1 | | 3/2007 | |
| DE | 102007056251 | A1 | | 1/2009 | |
| DE | 102011119579 | A1 | | 5/2013 | |
| DE | 102011121411 | A1 | | 6/2013 | |
| DE | 102016009825 | A1 | | 2/2018 | |
| DE | 102016123328 | A1 | | 6/2018 | |
| EP | 1493888 | A1 | | 1/2005 | |
| FR | 2768508 | A1 | * | 3/1999 | E05B 81/66 |
| FR | 2807088 | A3 | | 10/2001 | |
| GB | 2173542 | A | * | 10/1986 | E05B 81/66 |

OTHER PUBLICATIONS

"Hall Effect Sensor," https://www.electronics-tutorials.ws/electromagnetism/hall-effect.html (Year: 2018).*

Computer Generated Translation for FR 2768508 A1, Generated on Oct. 5, 2023, https://worldwide.espacenet.com/ (Year: 2023).*

Translation of International Search Report dated Mar. 16, 2020, for International Patent Application No. PCT/DE2019/101078.

* cited by examiner

MOTOR VEHICLE LOCK

This application is a national phase of International Application No. PCT/DE2019/101078 filed Dec. 12, 2019, which claims priority to German Patent Application No. 10 2019 100 593.0 filed Jan. 11, 2019.

FIELD OF DISCLOSURE

The present invention relates to the field of motor vehicle locking systems and relates to a motor vehicle lock.

BACKGROUND OF DISCLOSURE

Nowadays, vehicles frequently have sensors for detecting the position of the locking parts, such as the pawl and rotary latch. Such sensors or switches can detect at least one open position and one detent position of the locking mechanism, allowing a determination as to whether the movable part of a vehicle is locked.

From DE 10 2007 056 251 A1 a motor vehicle lock with a microswitch for detecting the position of the rotary latch and pawl relative to each other is known. The locking mechanism assigned to the lock works together with an additional contour lever which actuates the microswitch, and can thus provide information about the position of the rotary latch and pawl in relation to each other. A motor vehicle lock is also known from DE 10 2016 123 328 A1, which has an inductive sensor for detecting the pawl position and an additional inductive sensor for detecting the rotary latch position.

The disadvantage of the known prior art is that a plurality of sensors and/or additional levers are required to detect the rotary latch position and the ratchet position, in order to detect the position. The use of a plurality of sensors and/or additional levers increases the costs and constructional outlay of the motor vehicle lock.

SUMMARY OF DISCLOSURE

The present invention is therefore based on the technical object of providing at least one motor vehicle lock, the disadvantages of the prior art being at least reduced. In particular, it is the object of the present invention to propose a motor vehicle lock which enables the rotary latch position and the pawl position to be detected in a constructively simple manner.

The above object is achieved by a motor vehicle lock having the features according to the disclosure.

Further features, details, advantageous developments and improvements of the invention emerge from the description and the drawings. The features described in the description and the drawings can be combined with each other or modified in any desired, technologically practical manner, and can reveal further embodiments of the invention. It should be noted that the embodiments described below for explaining the invention are not restrictive.

According to the invention, the object is achieved by a motor vehicle lock for a movable part of a vehicle, in particular a door, hatch, rear hatch, seat, charging plug lock, hood, or sliding door. The motor vehicle lock has a locking mechanism made up of at least one pawl and one rotary latch, and a sensor arrangement assigned to the locking mechanism. The sensor arrangement comprises a fixed sensor and at least one sensing element disposed on the rotary latch, or vice versa, wherein the sensor generates at least two different signals associated with the presence and absence of the sensing element in the region of influence of the sensor. According to the invention, at least one second sensing element is provided, wherein the second sensing element is arranged on the pawl and wherein the first and the second sensing element, in particular jointly, are detectable by the fixed sensor. As such, different positions of the locking mechanism, in particular the rotary latch and pawl, are detectable.

An essential advantage of the motor vehicle lock according to the invention is that a plurality of positions of the locking mechanism, in particular the rotary latch and the at least one pawl, can be monitored and recognized. A precise conclusion can therefore be made about the exact position of the locking components. The sensor arrangement according to the invention can be used particularly advantageously for a closing aid of a motor vehicle lock, such that it is possible to reliably detect when an object has become trapped therein. The positions can in particular, but not exclusively, be a pre-locking position, a primary locking position, and at least one open position of the locking mechanism.

In order to further increase the accuracy of the detection, it is conceivable that a plurality of sensing elements are arranged on the at least one rotary latch and/or the at least one pawl.

Motor vehicle locks can have a plurality of locking positions. For example, a motor vehicle lock according to the invention can have at least one pre-locking position and one primary locking position, as well as an opened/unlocked position. In addition, generic motor vehicle locks can have at least one lock housing, a lock cover and a lock case (subsumed under the term lock housing in the following), the locking mechanism thus being substantially enclosed/closed off by the lock housing. Due to the configuration of the sensor arrangement according to the invention, in particular the fixed sensor, preferably in the lock housing, as well as the arrangement of the at least two sensing elements, at least the previously described locking positions can be detected. The sensing element preferably works together with the sensor in a contactless manner. In addition, however, there can also be tactile interaction in addition or as an alternative.

In addition, a control unit can be provided, having at least one processing unit for processing signals or data, at least one memory unit for storing signals or data, at least one interface to a sensor or an actuator for inputting sensor signals from the sensor or for outputting data or control signals to the actuator, and/or at least one communication interface for inputting or outputting data which are embedded in a communication protocol. The computing unit can be, for example, a signal processor, a microcontroller or the like, wherein the memory unit can be a flash memory, an EEPROM, or a magnetic memory unit. The communication interface can be designed to input or output data wirelessly and/or by wire, wherein a communication interface that can input or output data by wire, for example, can input this data electronically or optically from a corresponding data transmission line or can output it into a corresponding data transmission line.

The control unit can be designed to execute a diagnostic routine. This makes it possible to check whether the sensor arrangement/the sensor is in an operational state, or optionally to check whether there are malfunctions. Depending on a diagnostic routine, it is possible to recalibrate the system if necessary, to reset system parameters, or to display any errors so that maintenance is possible. As such, it is conceivable that the associated target measured values of a prespecified/defined position, for example the primary locking position, are stored and compared with actual measured values, so that deviations can be detected and conclusions can be drawn about possible malfunctions. During the product life cycle, changes, in particular caused by wear and tear or external environmental influences, can be recognized and included in the position determination. This increases the reliability of the position detection.

The motor vehicle lock according to the invention can advantageously have a lock drive, in particular a closing drive. The lock drive can be directly or indirectly operatively connected to the pawl and/or the rotary latch for locking and/or unlocking the locking mechanism. A removal or insertion of the pawl into a pre-locking position or a primary locking position can be contemplated. A closing drive preferably interacts with the rotary latch and can move/drive it at least from an open position into the pre-locking position, from the pre-locking position into the primary locking position, or from the primary locking position into an over-travel position. The closing drive can act directly or indirectly on the rotary latch.

According to a particularly advantageous refinement, the control unit evaluates signals from the sensor to control a lock drive, in particular a closing drive. In this case, for example, the intermediate position between the pre-locking position and the primary locking position may be detected. The intermediate position corresponds to the fact that a gap between a motor vehicle door, motor vehicle hatch, or motor vehicle hood associated with the motor vehicle lock is so small that nothing can become trapped in it. In this way, it is possible to cover situations in which the motor vehicle door is only briefly and incompletely pushed shut, and not closed. In this case, the sensor reports that the intermediate position has been reached, but not that the primary locking position has been assumed immediately after this.

In any case, it becomes clear that the motor vehicle lock according to the invention perfectly captures all conceivable locking scenarios such as inadvertent incomplete closures, etc., with a structurally simple and functionally reliable structure.

According to the invention, the sensor arrangement assigned to the locking mechanism can be arranged in the lock housing. This results in a compact design, and protection against external environmental influences can be achieved.

The rotary latch of a motor vehicle lock usually has a fork-shaped inlet slot formed by the load arm and catch arm, into which the locking bolt of a vehicle door or hatch enters when the door or hatch is closed. The locking bolt then swivels the rotary latch, which can be locked via the pawl. The locking bolt can then no longer leave the inlet slot of the rotary latch. This detent position is also called the primary locking position. The locking of the rotary latch and the pawl can preferably take place on the load arm of the rotary latch. For this purpose, the load arm has corresponding contours (locking contours) for different locking positions (pre-locking position, primary locking position) at which the pawl contacts and locks the rotary latch. The sensor arrangement can advantageously be arranged in/on the region described above. The fixed sensor can, for example, be arranged in the lock housing in such a way that an interaction with the sensing element on the rotary latch and the sensing element on the pawl can be achieved. Accordingly, it is conceivable to arrange the sensing element in each case in the region of the locking contour of the rotary latch and in the contact region, for example, the locking surface of the pawl. As a result, the locking positions, in particular the pre-locking position and primary locking position, can be detected particularly reliably by the fixed sensor and the sensing elements on the rotary latch and pawl. The (particularly) rotational movement of the rotary latch and pawl can thus be detected in particular along the radius of movement of the locking parts. Motor vehicle locks can also have so-called electronic component carriers for electrical and/or electronic components. According to the invention, the fixed sensor can be arranged on such electronic component carriers. The electronic component carrier can also be a circuit board or part of the lock housing.

Preferably, the sensing element is generally curved. It has also proven useful if the curved shape of the sensing element is adapted to a pivoting movement of the locking component which is detected. Since the sensing element is generally connected to the rotary latch, or constitutes or can constitute a component of the rotary latch, the curved shape is usually configured with an associated radius, which is measured according to the distance to the axis of rotation of the rotary latch. As a result, the curved shape of the sensing element is adapted to the pivoting movement of the locking component which is detected—in this case, the rotary latch.

In the context of the invention, in places where a motor vehicle lock for a movable part of a motor vehicle is referred to, this should be understood to include at least side door locks, wing doors, swing doors, rear doors, tailgate locks and hood locks and/or engine hood locks and charging connector locks. These all fall under the generic term motor vehicle lock.

In the context of the invention, the sensor arrangement can act, i.e., can be designed, capacitively, inductively, optically or magnetically.

Alternatively or additionally, the sensing element can also generate a changing electrical resistance in the sensor. In this case, the sensing element is, for example, a slide in a linear potentiometer or a rotatable adjusting ring in a rotary potentiometer. Such sensors for detecting pivot angles are also conceivable elsewhere in motor vehicles and are used, for example, to detect a swivel angle of a motor vehicle door, as described in detail in DE 10 2011 119 579 A1 of the applicant. The sensor is therefore designed as a resistance sensor. In this case, according to the position of the rotary latch, in the example, a largely linear signal of the sensor is generated as a function of the rotation angle of the rotary latch—in the present case, an accordingly changing electrical resistance.

Furthermore, there is the additional or alternative possibility that the sensing element generates a different optical light intensity in the sensor. In this case, the sensor is designed as an optoelectronic sensor. For example, in the simplest case, the sensing element may be a surface or line with a changing degree of reflection for light which is emitted by the sensor and falls on it, and which is received by an associated receiver. That is, depending on the angle of rotation of the rotary latch in the example, the sensing element attached to the rotary latch, upon changing reflectance, ensures that the light intensity received by the optoelectronic sensor after reflection on the sensing element is changed. In this case as well, it is again conceivable that the sensing element generates a largely linear signal as a function of the angle of rotation of the rotary latch, according to the position of the rotary latch in the measuring range of the sensor or optoelectronic sensor. It is possible to work with light in the visible range, as well as, for example, in the near infrared range.

The sensor arrangement is particularly preferably designed as a Hall sensor (sensor arrangement). It can particularly preferably be a linear Hall effect sensor. Such Hall sensors are particularly suitable for distance measurements or the measurement of rotary movements. Linear Hall sensors with a linear output characteristic can preferably be used, which output a signal proportional to the magnetic field strength. This can be provided as an analog voltage, pulse width modulated signal (PWM), or according to the SENT protocol. Their output characteristics can be linearized, so that tolerances of the magnets or the mechanical structure can be fully compensated for.

The sensors can be diagnosable and designed for precise distance measurements up to 40 mm, and angle measurements up to 180 degrees, and/or can have a redundancy function. In this case, two independent sensor chips (dual die) can be integrated in a TSSOP housing. Furthermore, direct-angle Hall sensors (2D) can be used, which are also able to measure the alignment of the field: In addition to the magnetic field component perpendicular to the chip surface, vertical Hall elements detect the component in the chip plane. The internal signal processing calculates angle information (up to 360 degrees) and position information from this. It can be particularly advantageous if the sensor arrangement, in particular the sensor, is designed to be self-calibrating. Measurement inaccuracies can thus at least be reduced.

It can be advantageous if the first sensing element and/or the second sensing element is designed to be magnetic, and in particular as a magnet. This is particularly advantageous if the sensor arrangement is designed as a Hall sensor (arrangement). The magnet can particularly preferably be designed as an insert part in the rotary latch and the pawl, in particular in a sheathing of the rotary latch or pawl. Plastic-bonded magnets, which are formed in particular in the sheathing of the rotary latch and/or pawl, are a further advantageous embodiment. Plastic-bonded magnets are particle composite materials in which permanent magnet powder is embedded in plastic binders. Hard ferrite (HF), various SmCo- and NdFeB powders and, to a very small extent, AlNiCo alloys are used as magnetic powder. Thermoplastic binders, such as polyamide (PA) or polyphenylene sulfide (PPS), and thermosetting plastics, such as epoxy resins, are used to bind the magnetic particles. Depending on the material composition and manufacturing process, isotropic and anisotropic magnets with different magnetic and mechanical values can be produced. Since not only the type of magnet and a plastics material, but also the degree of filling and alignment, determine the properties of the composite material, there is a wide range of magnetic parameters and a considerable variety of types and shapes. The magnets can be designed as magnetic adhesive tape in a particularly cost-effective manner. These can be in the form of a tape with an adhesive layer on one side and can be flexibly shaped.

It is also conceivable that at least one sensing element is arranged on a switching cam of the pawl and/or the rotary latch. The switching cam can be arranged on a common axis and/or fastened to the rotary latch or pawl, or formed from a sheathing of the rotary latch or pawl.

A switching cam according to the invention can, for example, reduce the distance between the rotary latch/rotary latch body or pawl/pawl body and the sensing element. This allows constructive freedoms to be achieved. The switching cam can, for example, be made of a plastics material, in particular a plastic injection-molded part or a 3D printed product, and can be disposed on the rotary latch, the pawl or the rotary latch axis or ratchet axis. If the sensor is then arranged, for example, on an electron component carrier or at a point on the lock housing which is so spaced from the sensing element that the sensor signals are influenced without switching cams, the switching cam according to the invention can provide a remedy. The sensing element, in particular the magnet, can be arranged as an insert on the switching cam, or the switching cam is designed, at least in sections, as a plastic-embedded magnet.

The switching cam can advantageously convert the rotational movement of the pawl and/or the rotary latch into a linear movement of the at least one sensing element. As a result, the variability in the use of installation space can be improved. For example, the electrical component carrier (EKT) can be designed more simply and the sensor arrangement or the EKT does not have to be laboriously constructed or adapted.

It can be advantageous if the sensing elements are each arranged on one side of the pawl and/or the rotary latch which is oriented towards the sensor. The signal quality can be improved as a result, while at the same time the required installation space can be reduced. If the at least one sensing element of the rotary latch and the at least one sensing element of the pawl are oriented in the same direction and oriented toward the sensor, the sensor can detect the position of the locking parts particularly easily and precisely. In this case, "a side" means, for example, the side/surface of the rotary latch or pawl that is oriented towards the lock plate on which the locking mechanism is mounted, or the corresponding side that faces away from the lock plate. This becomes even clearer when viewed together with the figures or the description of the figures.

The output signal of the sensor can advantageously be generated as a function of the angle of rotation of the rotary latch and/or the angle of rotation of the pawl, in particular the output voltage of the sensor can be changed as a function of the angle of rotation of the rotary latch and/or the angle of rotation of the pawl. If the sensor is connected to a control unit in a manner allowing the exchange of signals, the control unit can process the output signal of the sensor and thus infer the position of the pawl and rotary latch. The sensor particularly preferably supplies different output voltages as output signals, which are generated as a function of the angle of rotation of the rotary latch or pawl. The output voltage thus provides information on the position of the pawl and rotary latch, and many different positions can be detected. The change in the output voltage thus enables a plurality of, in particular exact, position signals that change with the movement. During the movement of the sensing elements along the fixed sensor, a large number of different output voltages are generated that provide information about the position. The evaluation of the output signals can then be processed by the control unit and used to control and/or regulate, for example, door drives, closing aids or opening drives.

Because the output signal, in particular the output voltage, of the sensor depends on the angle of rotation, the direction of movement/rotation of the locking parts can also be determined. Accordingly, a transition of the positions or the direction can also be determined. This means that it is possible to use the output signals to infer whether, for example, unlocking (from the primary locking position to the open position) or locking (from the open position to the pre-locking position or primary locking position) is being carried out. As a result, not only an exact position determination of the locking mechanism but also an opening or closing process can be detected.

Advantageously, at least one sensing element can substantially have a geometry that changes over its profile. In particular, the sensing element can have a width or thickness that changes in its longitudinal extension. In this way, the signal magnitude/strength in the region of influence of the sensor can be influenced, and as a result, the signals provide precise information about the positions. If the subregion of the sensing element is largest, for example, in the region of the pre-locking position or the primary locking position, then the signal magnitude/strength can thus be the greatest/highest.

It can be advantageous that the sensor signal is greatest when the sensing element of the rotary latch and the sensing element of the pawl are positioned in the region of influence of the sensor at the same time. This can particularly preferably correspond to the primary locking position. In the primary locking position, both the sensing element of the pawl and the sensing element of the rotary latch are accordingly arranged in the region of influence of the sensor. The sensing elements can be arranged completely or only in sections in the region of influence of the sensor. It is therefore conceivable that the output voltage of the sensor is greatest when both sensing elements are in the region of influence of the sensor. This preferably corresponds to the primary locking position, such that the output voltage of the sensor is greatest in the primary locking position.

Further measures improving the invention emerge from the following description of some embodiments of the invention, which are shown schematically in the figures. It should be noted that the figures are only of a descriptive character and are not intended to restrict the invention in any way. As such, embodiments which are not explicitly shown or explained in the figures, but which emerge and can be produced from the explained embodiments by means of separate combinations of features, should also be regarded as comprised and disclosed by the invention. In the figures, the same reference symbols denote the same or functionally identical components, unless stated otherwise:

DETAILED DESCRIPTION

Figure 1:
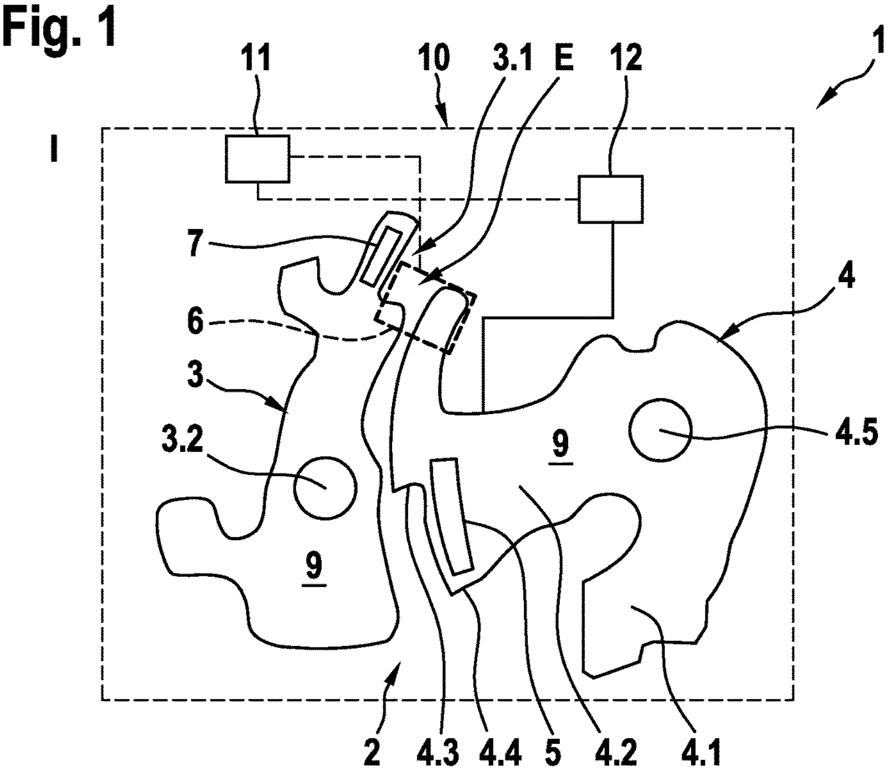
FIG. 1 is a possible embodiment of a motor vehicle lock according to the invention in the open position.

FIG. 1 shows a possible embodiment of the motor vehicle lock 1 according to the invention. The motor vehicle lock 1 comprises a locking mechanism consisting substantially of a pawl 3 and a rotary latch 4, as well as a sensor arrangement 5, 6, 7 with a fixed sensor 6, a sensing element 5 disposed on the rotary latch 4, and a sensing element 7 disposed on the pawl 3. The pawl 3 and the rotary latch 4 are not in a locking operative connection in FIG. 1, with the result that the lock 1 is unlocked and is thus positioned in the open position I. The sensor 6 has a region of influence E. In this region of influence E, the sensor 6 can detect the presence or absence of the sensing elements 5, 7 and generate a corresponding output signal. In the open position I shown, neither the sensing element 5 of the rotary latch 4 nor the sensing element 7 of the pawl 3 is in the region of influence E of the sensor 6. The sensor 6 thus detects the absence of the sensing elements 5, 7 and generates an output signal which corresponds to the open position I. A control unit 11 of the lock 1 or of a vehicle can then further process or evaluate the signal and, for example, control and/or regulate a lock drive 12, in particular a closing drive 12, door drive or the like.

The sensing element 7 of the pawl 3 and the sensing element 5 of the rotary latch 4 can each be arranged in a sheathing 9 of the pawl 3 or rotary latch 4. The sheathing 9 is preferably a sleeve comprising a plastics material at least in sections and sheathing the pawl 3 or rotary latch 4. The sheathing 9 is used, inter alia, to reduce noise. The sensing elements 5 and 7 can, for example, be inserted or injected into the sheath 9 comprising a plastics material, or they can be formed in the sheath 9 as a plastic-bonded magnet.

The rotary latch 4 has a catch arm 4.1 and a load arm 4.2, the sensing element 5 being arranged in the load arm 4.2 of the rotary latch 4. As shown in the embodiment, it is preferred if the sensing element 5 is located on the load arm 4.2 in the region of the pre-locking contour 4.3 and the primary locking contour 4.4. By way of example, the sensing element 5 of the rotary latch 4 is elongated and extends substantially in an arc shape from the primary locking position contour 4.4 to the pre-locking contour 4.3. The sensing element 7 of the pawl 3 is arranged on a locking contour 3.1 of the pawl 3. Here, too, the sensing element 7 is designed, for example, in an arcuate manner and extends along the locking contour 3.1.

Figure 2:
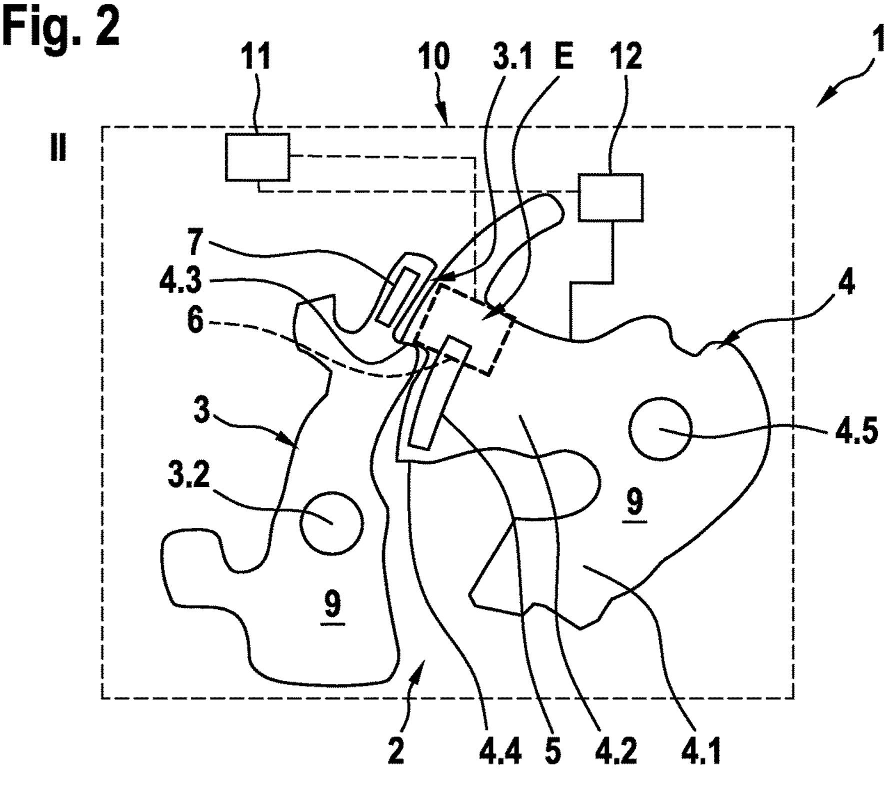
FIG. 2 is the possible embodiment from FIG. 1 in the pre-locking position.

If the rotary latch 4 rotates around the rotary latch axis 4.5 and/or the pawl 3 around the pawl axis 3.2, the positions of the sensing elements 5, 7 also change accordingly. During the rotation or when a locking position is reached, none, one or both sensing elements 5, 7 can be located in the region of influence E of the sensor 6. In FIG. 2, the pawl 3 is pivoted about the pawl axis 3.2 in the direction of the rotary latch 4, and the rotary latch 4 is pivoted about the rotary latch axis 4.5 at the same time, such that the pawl 3 with the locking contour 3.1 is in a locking operative connection with the pre-locking position contour 4.3 of the rotary latch 4. The sensing element 5 of the rotary latch 4 is located in the shown pre-locking position II in sections in the region of influence E of the sensor 6. The sensing element 7 of the pawl 3 is arranged outside the region of influence E in the pre-locking position according to the embodiment shown. The sensor 6 thus only detects the sensing element 5, in particular only a partial section of the sensing element 5, which is located in the region of influence E. From this, the sensor 6 generates an output signal which corresponds to the pre-locking position II.

Figure 3:
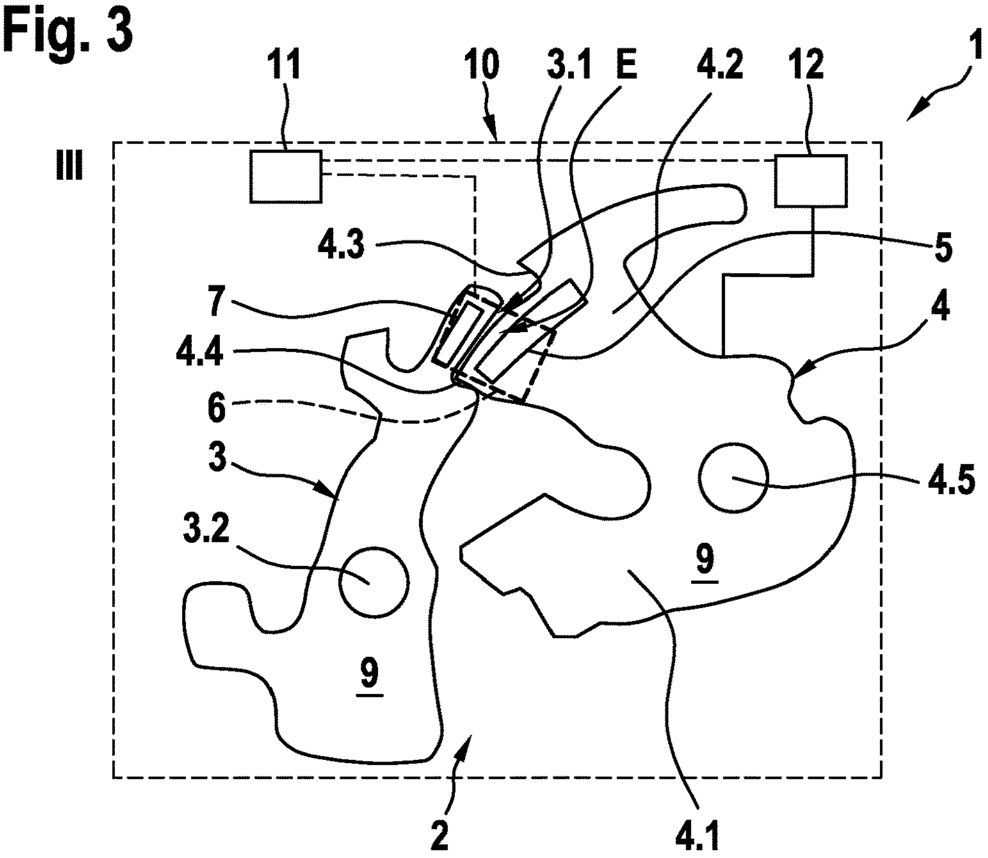
FIG. 3 is the possible embodiment from FIGS. 1 and 2 in the primary locking position.

FIG. 3 shows a possible embodiment of the motor vehicle lock 1 according to the invention, the locking mechanism 2 being in the primary locking position III. The locking contour 3.1 of the pawl 3 has dropped into the primary locking contour 4.4 and is supported on the primary locking contour 4.4 of the rotary latch 4, such that a locking bolt of a lock holder is fixed by the rotary latch 4, and the movable part of a vehicle is held in the closed position.

In the primary locking position III, the sensing element 7 of the pawl 3 arranged in the region of the locking contour 3.1 and the sensing element 5 of the rotary latch 4 are both positioned at least in sections in the region of influence E of the fixed sensor 6. The sensor 6 is particularly preferably designed as a Hall sensor, and the sensing elements 5 and 7 as magnets. In the embodiment, the output signal of the sensor 6 is greatest in the primary locking position III shown. The output signal is therefore greatest/strongest when both sensing elements 5 and 7 are located at least in sections in the region of influence E of the sensor 6. The sensing element 5 and/or 7 is preferably integrated as a magnet into the sheathing 9 of the pawl or rotary latch, for example as an insert, or overmolded by the sheathing 9 comprising a plastics material.

As is particularly clear from FIG. 3, the invention enables the use of a sensor 6 with a sensing element 7 on a pawl 3 and a sensing element 5 of the rotary latch 4, and the detection of numerous positions of the locking mechanism 2, i.e., of the rotary latch 4 and the pawl 3. A further sensor and/or additional lever is therefore not absolutely necessary in order to detect the positions of the locking mechanism, at least an open position I, a pre-locking position II and/or a primary locking position III. The preferably fixed sensor 6, as well as the sensing element 5 of the rotary latch 4 and the sensing element 7 of the pawl 3, are arranged according to the invention in the motor vehicle lock 1 in such a way that a plurality of positions can be detected with only one sensor 6.

Figure 4:
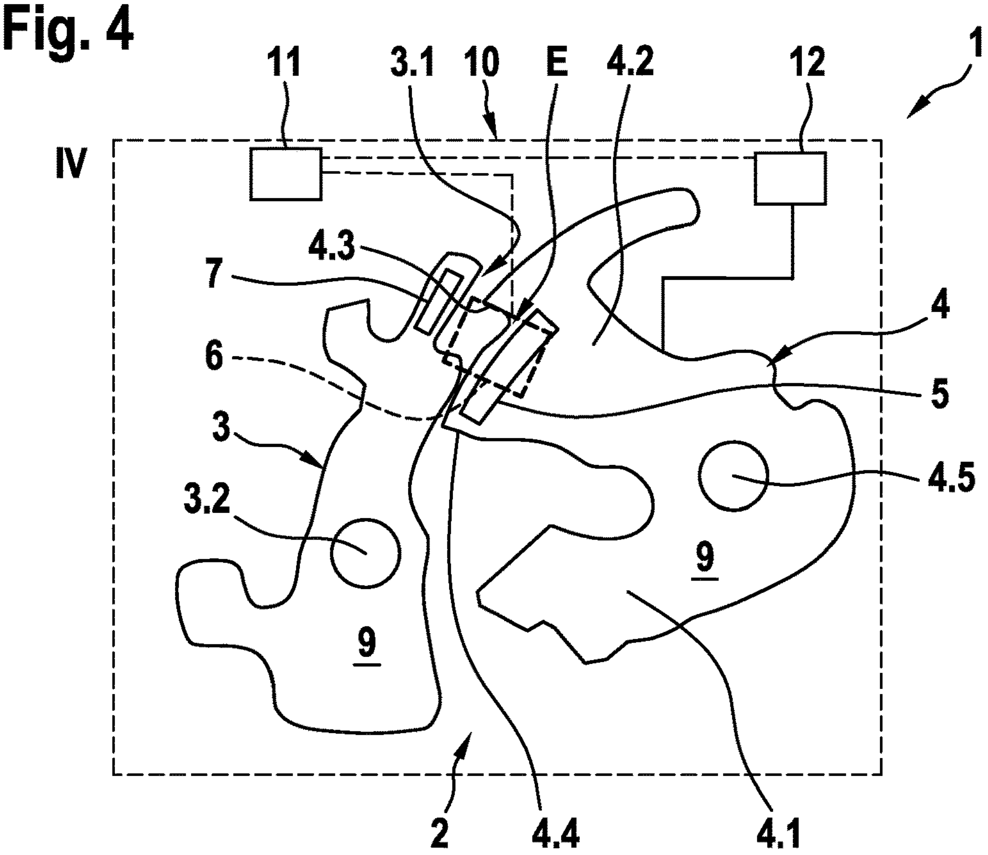
FIG. 4 is the possible embodiment from FIGS. 1, 2 and 3 in any intermediate position.

FIG. 4 shows an intermediate position IV of the locking mechanism 2, which is located between the primary locking position III and the pre-locking position II. This arbitrarily selected intermediate position IV can also be reliably detected by the sensor arrangement 5, 6, 7 according to the invention. For example, the intermediate position IV can be defined as a case of an object being trapped. The sensing element 5 of the rotary latch 4 extends at least between the primary locking position contour 4.4 and the pre-locking contour 4.3 of the rotary latch, such that the sensing element 5 can be detected by the region of influence E of the sensor 6 on this piece/distance. If the sensing element 5 of the rotary latch 4 is located in the region of influence E of the sensor 6, as shown, an output signal is generated by the sensor 6 which reflects the presence of the sensing element 5 and thus the rotary latch 4 in the region of influence E of the sensor 6. At the same time, the sensing element 7 of the pawl 3 is located outside the region of influence E of the sensor 6. For example, a control unit 11, which can be connected to the sensor 6 in a manner allowing the exchange of signals, can evaluate the output signals and thus determine the position of the locking mechanism 2 and, in particular, activate or deactivate a lock drive 12, such as a closing aid. An object being trapped is thus recognized on the basis of the detected intermediate position IV, and the control unit 11 can deactivate the closing drive 12 and/or let it move back.

According to the invention, it can be provided that the direction of movement of the rotary latch 4 and/or the pawl 3 can also be detected by the sensor arrangement 5, 6, 7 according to the invention. This means that the movement from the primary locking position III in the direction of the pre-locking position II or the open position I, and vice versa from the open position I in the direction of the pre-locking position II or the primary locking position III, and the intermediate positions IV, can be detected. The sensor arrangement 5, 6, 7 is designed in such a way that the output signals provide a conclusion about the direction of movement as a result of the detection of the absence or presence of the sensing element 5 and 7. The output signals can be correspondingly different if the sensing element 5 of the rotary latch 4 is detected first in the region of influence E of the sensor 6, and only then the sensing element 7 of the pawl 3 is detected. Conversely, the sensor 6 can generate a corresponding output signal when the pawl 3 and thus the sensing element 7 is lifted off the rotary latch 4, i.e., the lock 2 is unlocked and the sensing element 7 disappears from the region of influence E of the sensor 6.

In addition, the strength of the output signal of the sensor 6 can be influenced via the geometry of the sensing element 5 and/or 7, so that, for example, the direction of movement can be recognized. It is thus conceivable that the thickness or width of the sensing element 5 changes in its course between the pre-locking contour and the primary locking contour of the rotary latch 4. For example, the width or thickness of the sensing element 5 in the region of the primary locking contour 4.4 could be greater than in the region of the pre-locking contour 4.3. The output signal would thus be amplified in the thicker/wider area of the sensing element 5 and thus in the region of the primary locking contour 4.4. The configuration is also conceivable, in addition or as an alternative, on the pawl 3. In particular in the case of a sensor 6 in the form of a Hall sensor, and a sensing element 5, 7 designed to be magnetic, an embodiment described above can be advantageous.

The foregoing description has been presented for purposes of explanation with reference to specific implementations. However, the above illustrative discussions are not intended to be exhaustive or to limit the scope of the disclosure. Many modifications and variations are possible in light of the above teachings. The implementations have been selected to best explain the principles underlying the disclosure and practical applications, thereby enabling others skilled in the art to use the implementations, particularly with various modifications as may be appropriate for the specific contemplated applications.

If an embodiment comprises an "and/or" link between a first feature and a second feature, this is to be read in such a way that the embodiment according to one embodiment has both the first feature and the second feature and, according to a further embodiment, either only the first feature or only the second feature.

LIST OF REFERENCE SIGNS

1 motor vehicle lock
2 locking mechanism
3 pawl
3.1 locking contour
3.2 pawl axis
4 rotary latch
4.1 catch arm
4.2 load arm
4.3 pre-locking contour
4.4 primary locking contour
4.5 rotary latch axis
5 sensing element of the rotary latch
6 sensor
7 sensing element of the pawl
8 switch cams
9 sheathing
10 lock housing
11 control unit
12 lock drive, closing drive
E region of influence of the sensor
I open position
II pre-locking position
III primary locking position
IV intermediate position

The invention claimed is:

1. A motor vehicle lock for a movable part of a vehicle, the motor vehicle lock comprising:

a locking mechanism having a pawl and a rotary latch; and a sensor arrangement assigned to the locking mechanism, with the sensor arrangement having a fixed sensor, a first sensing element disposed on the rotary latch, and a second sensing element disposed on the pawl, wherein the first sensing element and the second sensing element are detectable by the fixed sensor, such that a position of the rotary latch and the pawl are detectable by the fixed sensor such that a pre-locking position, a primary locking position, an intermediate position, and an open position of the locking mechanism are detectable, the fixed sensor being formed as a Hall sensor, wherein the fixed sensor generates different output signals associated with the pre-locking position, the primary locking position, the intermediate position, and the open position, and wherein the different output signals of the fixed sensor are generated as a function of an angle of rotation of the rotary latch and/or an angle of rotation of the pawl, wherein a width of the first sensing element changes between a pre-locking contour of the rotary latch and a primary locking contour of the rotary latch, and wherein the width of the first sensing element in the region of the primary locking contour is larger than in a region of the pre-locking contour, wherein the different widths of the first sensing element correspond to the different output signals generated by the fixed sensor.

2. The motor vehicle lock according to claim 1, wherein the sensor arrangement is configured to act magnetically.

3. The motor vehicle lock according to claim 1, wherein the first sensing element and/or the second sensing element is formed as a magnet.

4. The motor vehicle lock according to claim 3, wherein a sheathing of the rotary latch and/or the pawl is at least partially formed with a plastic-bonded magnet forming the magnet of the first sensing element and/or the second sensing element.

5. The motor vehicle lock according to claim 1, wherein the first sensing element and/or the second sensing element is formed as an insert part.

6. The motor vehicle lock according to claim 5, wherein the insert part is arranged in a sheathing of the rotary latch and/or the pawl.

7. The motor vehicle lock according to claim 1, wherein the first sensing element or the second element is arranged on a switching cam of the pawl or the rotary latch, respectively.

8. The motor vehicle lock according to claim 7, wherein the switching cam is configured to convert the rotational movement of the pawl or the rotary latch into a linear movement of the first sensing element and/or the second sensing element.

9. The motor vehicle lock according to claim 1, wherein the first sensing element and the second sensing element are each arranged on a side of the pawl and the rotary latch, respectively, such that first and second sensing elements are each oriented towards the fixed sensor.

10. The motor vehicle lock according to claim 1, wherein an output voltage of the fixed sensor is changed as a function of the angle of rotation of the rotary latch and/or the angle of rotation of the pawl.

11. The motor vehicle lock according to claim 1, wherein an output signal of the different output signals is greatest when the first sensing element of the rotary latch and the second sensing element of the pawl are simultaneously positioned in a region of influence of the fixed sensor.

12. The motor vehicle lock according to claim 1, wherein an absence of the first sensing element and/or an absence of the second sensing element in a region of influence of the fixed sensor occurs when the locking mechanism is in the open position, and wherein a presence of the first sensing element and/or a presence of the second sensing element occurs in the region of influence when the locking mechanism is in at least one of the pre-locking position, the intermediate position, and the primary locking position.

13. The motor vehicle lock according to claim 12, wherein an absence of one of the first sensing element and the second sensing element and a presence of another one of the first sensing element and the second sensing element occurs when the locking mechanism is in the pre-locking position.

14. The motor vehicle lock according to claim 12, wherein the first sensing element is present in a first portion of the region of influence when the locking mechanism is in the pre-locking position, wherein the first sensing element is present in a second portion of the region of influence when the locking mechanism in the intermediate position.

15. The motor vehicle lock according to claim 1, wherein the first sensing element has a curved shape, wherein the curved shape has a radius measured according to a distance of the first sensing element to an axis of rotation of the rotary latch.

* * * * *